(12) United States Patent
Liu et al.

(10) Patent No.: US 12,443,212 B2
(45) Date of Patent: Oct. 14, 2025

(54) BAND-GAP REFERENCE SOURCE CIRCUIT AND ELECTRONIC APPARATUS

(71) Applicant: SMARTER MICROELECTRONICS (GUANG ZHOU) CO., LTD., Guangzhou (CN)

(72) Inventors: Chifeng Liu, Guangzhou (CN); Yongxiang Li, Guangzhou (CN); Xin Zhang, Guangzhou (CN)

(73) Assignee: SMARTER MICROELECTRONICS (GUANG ZHOU) CO., LTD., Guangzhou (CN)

(*) Notice: Subject to any disclaimer, the term of this patent is extended or adjusted under 35 U.S.C. 154(b) by 237 days.

(21) Appl. No.: 18/467,002

(22) Filed: Sep. 14, 2023

(65) Prior Publication Data
US 2023/0418317 A1   Dec. 28, 2023

Related U.S. Application Data

(63) Continuation of application No. PCT/CN2022/114016, filed on Aug. 22, 2022.

(30) Foreign Application Priority Data

Aug. 20, 2021   (CN) .......................... 202110961567.5

(51) Int. Cl.
  *G05F 3/24*   (2006.01)
  *G05F 3/30*   (2006.01)

(52) U.S. Cl.
  CPC . *G05F 3/24* (2013.01); *G05F 3/30* (2013.01)

(58) Field of Classification Search
  CPC . G05F 3/24; G05F 3/242; G05F 3/245; G05F 3/247; G05F 3/30
  See application file for complete search history.

(56) References Cited

U.S. PATENT DOCUMENTS

2004/0051581 A1* 3/2004 Abe .................. G05F 3/30
                                                            327/539

FOREIGN PATENT DOCUMENTS

CN      206249134 U   *  6/2017
CN      206991153 U   *  2/2018

OTHER PUBLICATIONS

Machine translation of CN 206249134 by Clarivate Analytics, Jul. 2025, 11 pages.*
Machine translation of CN 206991153 by Clarivate Analytics, Jul. 2025, 5 pages.*

* cited by examiner

*Primary Examiner* — Harry R Behm
(74) *Attorney, Agent, or Firm* — SYNCODA LLC; Feng Ma

(57) ABSTRACT

A band-gap reference source circuit is configured to be connected with an electronic device. The band-gap reference source circuit comprises: a power supply, a start circuit, a core circuit, an output circuit and a shunt circuit, wherein the power supply is connected to first ends of the start circuit, the core circuit and the output circuit; a second end of the start circuit is connected to the core circuit; a second end of the core circuit is connected to the output circuit, and a control end of the core circuit is connected to the shunt circuit and used for providing a control signal for the shunt circuit; an output end of the output circuit is used for connecting to an electronic device; and a first end of the shunt circuit is connected to the output end of the output circuit, and controls a current of a second end.

10 Claims, 4 Drawing Sheets

BAND-GAP REFERENCE SOURCE CIRCUIT AND ELECTRONIC APPARATUS

CROSS-REFERENCE TO RELATED APPLICATIONS

This is a continuation of International Application No. PCT/CN2022/114016 filed on Aug. 22, 2022, which claims priority to Chinese Patent Application No. 202110961567.5 filed on Aug. 20, 2021. The disclosures of the above-referenced applications are hereby incorporated by reference in their entirety.

BACKGROUND

In a circuit design, a surge refers to a strong pulse generated in a power supply at the moment when the power supply is turned on, and an external pulse received by the power supply and the circuit. The surge includes a surge voltage and a surge current.

A band-gap reference source circuit, as an important basic component unit in an analog integrated circuit, is often used to provide an accurate reference voltage or reference current to other circuit modules.

SUMMARY

A circuit is likely to be damaged at the moment of surge arrival, such as capacitor breakdown of PN junction, burning of resistor, breakdown of metal-oxide-semiconductor field-effect transistor (MOS) and so on.

The band-gap reference source circuit will provide a higher voltage or current to other circuit modules when surge comes, which will lead to the damage of the circuit modules by the surge current.

The disclosure relates to the technical field of circuit design, and in particular to a band-gap reference source circuit and an electronic apparatus.

Embodiments of the disclosure provide a band-gap reference source circuit that can effectively protect circuit modules connected with the band-gap reference source circuit.

The embodiments of the disclosure provide a band-gap reference source circuit, which is configured to be connected with an electronic device. The band-gap reference source circuit includes a power supply, a starting circuit, a core circuit, an output circuit and a shunt circuit.

The power supply is connected with first ends of the starting circuit, the core circuit and the output circuit, respectively, for feeding power.

A second end of the starting circuit is connected with the core circuit for providing a starting signal to the core circuit.

A second end of the core circuit is connected with the output circuit, and a control end of the core circuit is connected with the shunt circuit for providing a control signal to the shunt circuit.

An output end of the output circuit is configured to be connected with the electronic device, and the output circuit provides a voltage and/or a current based on the core circuit.

A first end of the shunt circuit is connected with the output end of the output circuit, and a current of a second end is controlled based on the control signal to shunt the output circuit.

In the above solution, the control signal includes a first voltage difference signal and a second voltage difference signal.

The shunt circuit is turned on when a difference between the first voltage difference signal and the second voltage difference signal is greater than a preset value.

The shunt circuit is turned off when a difference between the first voltage difference signal and the second voltage difference signal is less than a preset value.

In the above solution, the shunt circuit includes a shunt MOS transistor.

A first end of the shunt MOS transistor is connected with the output end of the output circuit. A second end of the shunt MOS transistor is connected with a control node of the control end of the core circuit. A third end of the shunt MOS transistor is connected with a ground wire.

In the above solution, the shunt MOS transistor includes a second MOS transistor and a third MOS transistor. The second MOS transistor is an N-type MOS transistor and the third MOS transistor is a P-type MOS transistor. A drain of the second MOS transistor is connected with the output end of the output circuit. A gate of the second MOS transistor is connected with a first node of the core circuit. A source of the second MOS transistor is connected with a source of the third MOS transistor. A gate of the third MOS transistor is connected with a second node of the core circuit.

The core circuit transmits the first voltage difference signal to the gate of the second MOS transistor through the first node, and the core circuit transmits the second voltage difference signal to the gate of the third MOS transistor through the second node; the second MOS transistor and the third MOS transistor are turned on under an action of the first voltage difference signal and the second voltage difference signal.

In the above solution, the second MOS transistor and the third MOS transistor are turned on when the difference between the first voltage difference signal and the second voltage difference signal is greater than a sum of threshold voltages of the second MOS transistor and the third MOS transistor.

In the above solution, the output circuit has a first output module for outputting a current and/or a second output module for outputting a voltage.

In the above solution, the first output module includes a first MOS transistor. A first end of the first MOS transistor is connected with the power supply. A second end of the first MOS transistor is connected with the core circuit and forms a first current mirror. A third end of the first MOS transistor is connected with the electronic device.

The second output module includes a tenth MOS transistor. A first end of the tenth MOS transistor is connected with the power supply. A second end of the tenth MOS transistor is connected with the core circuit and forms a second current mirror. A third end of the tenth MOS transistor is connected with a first end of a fifth resistor and configured to be connected with the electronic device. A second end of the fifth resistor is grounded.

In the above solution, the starting circuit includes a second starting circuit and a fourth MOS transistor.

A first end of the second starting circuit is connected with the power supply. A second end of the fourth MOS transistor is connected with the second starting circuit. A first end of the fourth MOS transistor is connected with the second end of the core circuit and a second end of the shunt circuit. A third end of the fourth MOS transistor is connected with the second starting circuit. A second end of the second starting circuit is connected with the ground wire.

In the above solution, the second starting circuit includes a first resistor and a first diode.

A first end of the first resistor is connected with the power supply. A second end of the first resistor is configured to be connected with the second end of the fourth MOS transistor. The first end of the fourth MOS transistor is connected with the second ends of the core circuit and the shunt circuit. The third end of the fourth MOS transistor is connected with a first end of the first diode. A second end of the first diode is connected with the ground wire.

In the above solution, the core circuit includes a fifth MOS transistor, a sixth MOS transistor, a second diode, an eighth MOS transistor, a ninth MOS transistor, and a third diode.

A first end of the fifth MOS transistor is connected with the power supply. A second end of the fifth MOS transistor is connected with the first end of the fourth MOS transistor. A third end of the fifth MOS transistor is connected with a first end of the sixth MOS transistor. The first end of the sixth MOS transistor is connected with the second end of the second MOS transistor. The first end of the sixth MOS transistor is the first node. A second end of the sixth MOS transistor is connected with the starting circuit. A third end of the sixth MOS transistor is connected with the second end of the third MOS transistor and a first end of the second diode, respectively. The third end of the sixth MOS transistor is the second node. A second end of the second diode is connected with the ground wire.

A first end of the eighth MOS transistor is connected with the power supply. A second end of the eighth MOS transistor is connected with the first end of the fourth MOS transistor and a third end of the eighth MOS transistor, respectively. The third end of the eighth MOS transistor is connected with the first end of the ninth MOS transistor. A second end of the ninth MOS transistor is connected with the second end of the sixth MOS transistor. A third end of the ninth MOS transistor is connected with a first end of the third diode. A second end of the third diode is connected with the ground wire.

Herein, the starting circuit further includes a seventh MOS transistor.

A first end of the seventh MOS transistor is connected with a second end of the first resistor. A second end of the seventh MOS transistor is connected with the second end of the sixth MOS transistor. A third end of the seventh MOS transistor is connected with the first end of the first diode.

In the above solution, the first core circuit further includes a third resistor and a fourth resistor.

First ends of the third resistor and the fourth resistor are connected with the third end of the ninth MOS transistor. A second end of the third resistor is grounded. A second end of the fourth resistor is connected with the first end of the third diode.

The third resistor is configured to shunt a current flowing through the third diode. The fourth resistor is configured to divide a voltage flowing through the third diode.

Embodiments of the disclosure further provide an electronic apparatus, including an electronic device and a band-gap reference source circuit connected with the electronic device.

In the embodiments of the disclosure, the provided band-gap reference source circuit is configured to be connected with the electronic device. The band-gap reference source circuit includes a power supply, a starting circuit, a core circuit, an output circuit and a shunt circuit. The power supply is connected with the first ends of the starting circuit, the core circuit and the output circuit respectively for feeding power. The second end of the starting circuit is connected with the core circuit and configured to provide a starting signal to the core circuit. The second end of the core circuit is connected with the output circuit, and the control end of the core circuit is connected with the shunt circuit for providing a control signal to the shunt circuit. The output end of the output circuit is configured to be connected with the electronic device, and the output circuit provides a voltage and/or a current based on the core circuit. The first end of the shunt circuit is connected with the output end of the output circuit, and a current of the second end is controlled based on the control signal to shunt the output circuit. Then, part of the current is consumed through the ground wire, so as to reduce the current of the electronic device and effectively protect the electronic device connected with the band-gap reference source circuit.

DETAILED DESCRIPTION

In order to make the purpose, technical solution and advantages of the disclosure clearer, the technical solution of the disclosure will be further described in detail in some embodiments below with reference to the drawings and embodiments. The described embodiments should not be regarded as limitations of the disclosure, and all other embodiments obtained by those of ordinary skill in the art without paying any creative work are within the protection scope of the disclosure.

The following description referring to "some embodiments" describes a subset of all possible embodiments. However, it should be understood that "some embodiments" may be the same subset or different subsets of all the possible embodiments, and may be combined with each other if there is no conflict.

If a similar description of "first/second" appears in the application document, the following description is added. The terms "first\second\third" involved in the following description are only to distinguish similar objects, but do not represent a specific ordering of the objects. It should be understood that the "first\second\third", where it is allowable, may be interchanged or reversed in a particular order or sequence, to enable the embodiments of the disclosure described herein to be implemented in an order other than those illustrated or described herein.

Unless otherwise defined, all technical and scientific terms used herein have the same meanings as those commonly understood by those skilled in the art of the disclosure. The terms used herein are for the purpose of describing the embodiments of the disclosure only, and are not intended to limit the disclosure.

Figure 1:
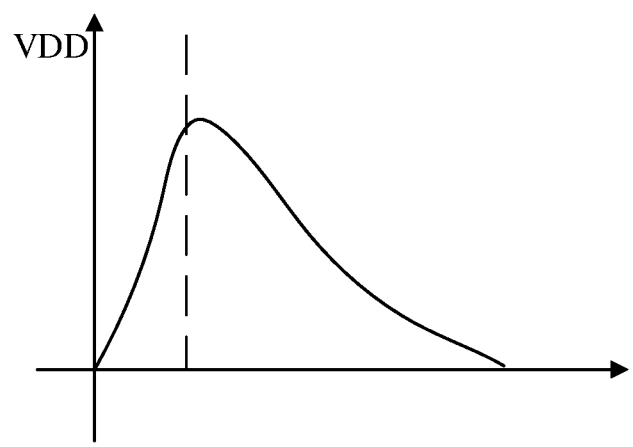
FIG. 1 is a graph showing the change of the power supply voltage during surging.

As shown in FIG. 1, when a surge occurs, the VDD (power supply) will rise to a very high voltage in a short time, and a band-gap reference source circuit in the related art has no time to be turned on during the rise of VDD. When the VDD rises to the maximum value, because the voltage of the VDD is very high, a large current will flow through a branch of the band-gap reference source circuit in the related art, and meanwhile the reference current and the reference voltage will also increase rapidly. The huge current and excessive voltage may damage a connected electronic device.

Figure 2:
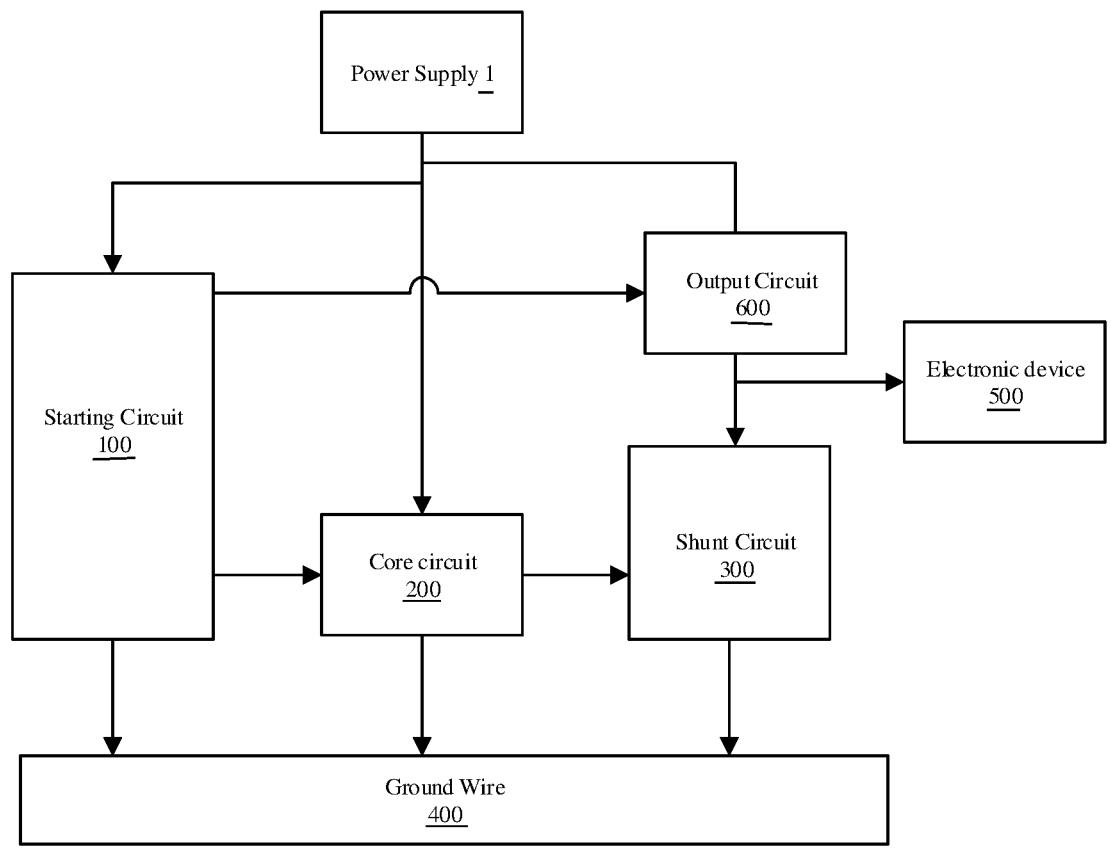
FIG. 2 is a first structural diagram of a band-gap reference source circuit provided by an embodiment of the disclosure.

In order to solve the technical problem that the band-gap reference source circuit damages the electronic device during surging in the related art, embodiments of the disclosure provide a band-gap reference source circuit. Reference is made to FIG. 2, which is a first structural diagram of a band-gap reference source circuit provided by an embodiment of the disclosure.

The band-gap reference source circuit provided by the embodiments of the disclosure is connected to an electronic device 500. The band-gap reference source circuit includes a power supply 1, a starting circuit 100, a core circuit 200, an output circuit 600 and a shunt circuit 300.

The power supply 1 is connected with the first ends of the starting circuit 100, the core circuit 200 and the output circuit 600 respectively for feeding power.

The second end of the starting circuit 100 is connected with the core circuit 200 for providing a starting signal to the core circuit 200.

The second end of the core circuit 200 is connected with the output circuit 600, and the control end of the core circuit 200 is connected with the shunt circuit 300 for providing a control signal to the shunt circuit 300.

The output end of the output circuit 600 is configured to be connected with the electronic device 500, and the output circuit 600 provides a voltage and/or a current based on the core circuit 200.

The first end of the shunt circuit 300 is connected with the output end of the output circuit 600, and the current of the second end is controlled based on the control signal to shunt the output circuit 600.

The power supply 1 provides an electrical signal to the first end of the core circuit 200. The core circuit 200 rises the voltage difference under the action of the electrical signal and provides a control signal to the second end of the shunt circuit 300. The shunt circuit 300 is turned on under the action of the control signal, and part of the current is consumed through the ground wire 400 to reduce a current of the electronic device 500.

In the embodiment of the disclosure, the voltage difference of the core circuit 200 rises rapidly under the action of the electrical signal of the power supply when the surge occurs. The shunt circuit 300 connected with the core circuit 200 is turned on due to the increase of the voltage difference of the core circuit 200, and a part of the current at the shunt circuit 300 is consumed from the ground wire, so that the current through the electronic device 500 is reduced, thereby effectively protecting the electronic device 500 connected to the band-gap reference source circuit.

In an embodiment of the disclosure, the control signal includes a first voltage difference signal and a second voltage difference signal.

When a difference between the first voltage difference signal and the second voltage difference signal is greater than a preset value, the shunt circuit 300 is turned on.

When a difference between the first voltage difference signal and the second voltage difference signal is less than a preset value, the shunt circuit 300 is turned off.

In an embodiment of the disclosure, the shunt circuit 300 includes a shunt MOS transistor.

The first end of the shunt MOS transistor is connected with the output end of the output circuit 600. The second end of the shunt MOS transistor is connected with a control node of the control end of the core circuit 200. The third end of the shunt MOS transistor is connected with the ground wire.

The core circuit 200 delivers the first voltage difference signal and the second voltage difference signal to the shunt MOS transistor through the control node. When a difference between the first voltage difference signal and the second voltage difference signal is greater than a preset value, the MOS transistor is turned on to consume a part of the current through the ground wire 400, so as to reduce the current of the electronic device 500.

Figure 3:
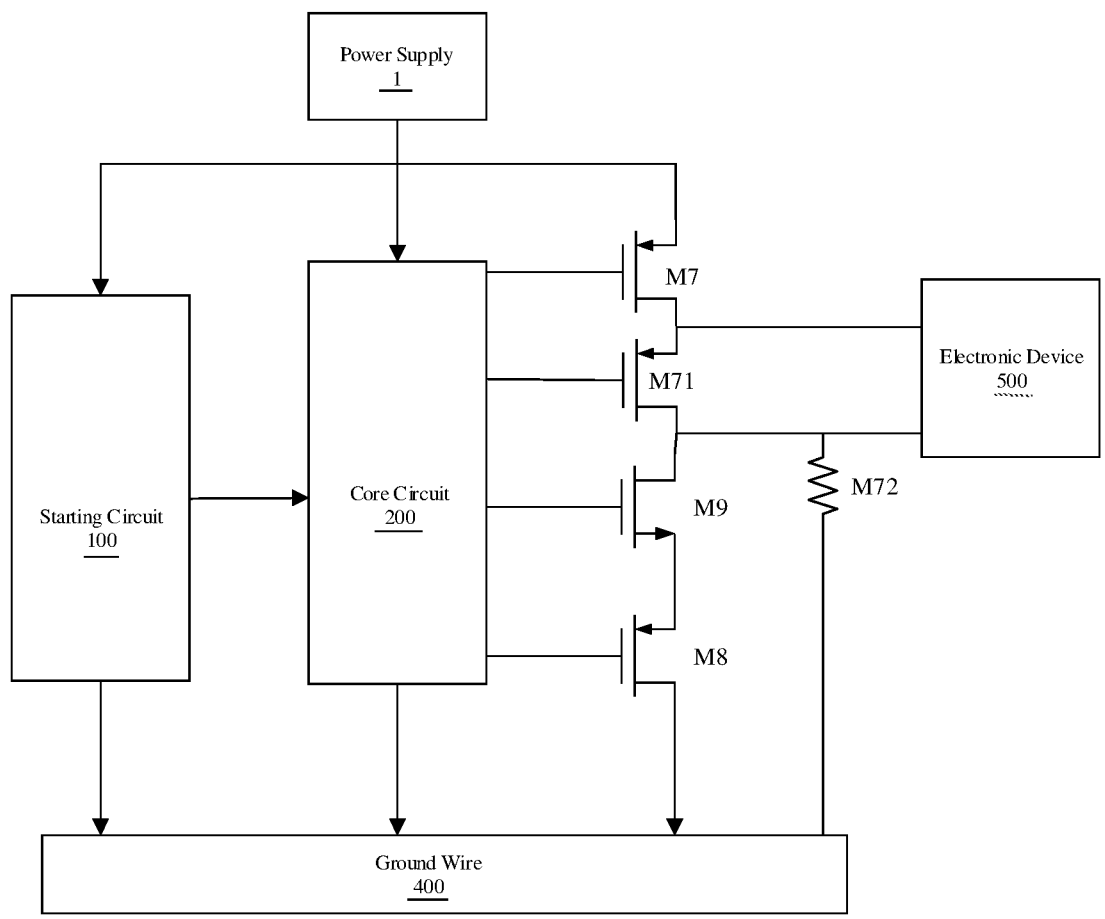
FIG. 3 is a second structural diagram of a band-gap reference source circuit provided by an embodiment of the disclosure.

Reference is made to FIG. 3, which is a second structural diagram of a band-gap reference source circuit provided by an embodiment of the disclosure.

In the embodiment of the disclosure, the shunt circuit 300 includes a second MOS transistor M9 and a third MOS transistor M8.

The second MOS transistor M9 is an N-type MOS transistor. The third MOS transistor M8 is a P-type MOS transistor. The drain of the second MOS transistor M9 is connected to the drain of the first MOS transistor (the output end of the output circuit 600). The gate of the second MOS transistor M9 is connected with the first node of the core circuit 200. The source of the second MOS transistor M9 is connected with the source of the third MOS transistor M9. The gate of the third MOS transistor M9 is connected with the second node of the core circuit 200. The drain of the third MOS transistor M8 is connected to the ground wire 400.

The core circuit 200 transmits a first voltage difference signal to the gate of the second MOS transistor M9 through the first node. The core circuit 200 transmits a second voltage difference signal to the gate of the third MOS transistor M8 through the second node. The second MOS transistor M9 and the third MOS transistor M8 are turned on under the action of the first voltage difference signal and the second voltage difference signal, and a part of the current is consumed through the ground wire 400 to reduce the current of the electronic device 500.

The second MOS transistor M9 and the third MOS transistor M8 are turned on when the difference between the first voltage difference signal and the second voltage difference signal is greater than the sum of the threshold voltages of the second MOS transistor M9 and the third MOS transistor M8.

In the embodiment of the disclosure, the condition to turn on the second MOS transistor M9 is that a gate voltage minus a source voltage of the second MOS transistor M9 is greater than a threshold voltage, the condition to turn on the third MOS transistor M8 is that a source voltage of the third MOS transistor M8 minus a gate voltage of the third MOS transistor M8 is greater than a threshold voltage; in addition the gate voltage of the second MOS transistor M9 is the first voltage difference signal, the gate voltage of the third MOS transistor M8 is the second voltage difference signal, and the source voltage of the second MOS transistor M9 is equal to the source voltage of the third MOS transistor M8, so that the difference between the gate voltage of the second MOS transistor M9 and the source voltage of the second MOS transistor M9 plus the difference between the source voltage of the third MOS transistor M8 and the gate voltage of the third MOS transistor M8 is equivalent to the first voltage difference signal minus the second voltage difference signal. Therefore when the first voltage difference signal minus the second voltage difference signal is greater than the sum of the threshold voltages of the second MOS transistor M9 and the third MOS transistor M8, the second MOS transistor M9 and the third MOS transistor M8 are turned on.

In an embodiment of the disclosure, the output circuit 600 has a first output module for outputting a current and/or a second output module for outputting a voltage.

Reference is made to FIG. 3, which is a second structural diagram of a band-gap reference source circuit provided by an embodiment of the disclosure.

In the embodiment of the disclosure, the first output module includes a first MOS transistor M7. The first end of the first MOS transistor M7 is connected with the power supply 1. The second end of the first MOS transistor M7 is connected with the core circuit 200 and forms a first current mirror. The third end of the first MOS transistor M7 is connected with the electronic device 500.

The second output module includes a tenth MOS transistor M71. The first end of the tenth MOS transistor M71 is connected with the power supply 1. The second end of the tenth MOS transistor M71 is connected with the core circuit 200 and forms a second current mirror. The third end of the tenth MOS transistor M71 is connected with the first end of the fifth resistor M72 and configured to be connected with the electronic device 500. The second end of the fifth resistor M72 is grounded.

Figure 4:
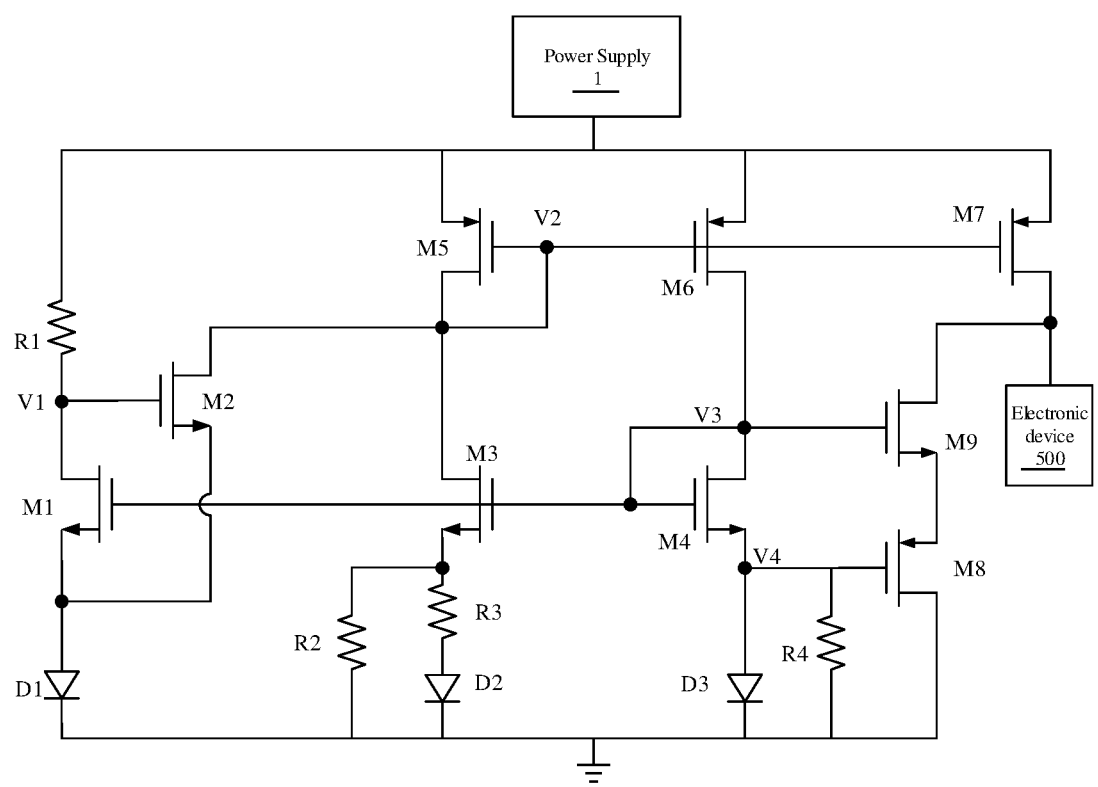
FIG. 4 is a third structural diagram of a band-gap reference source circuit provided by an embodiment of the disclosure.

Reference is made to FIG. 4, which is a third structural diagram of a band-gap reference source circuit provided by an embodiment of the disclosure.

The starting circuit includes a second starting circuit and a fourth MOS transistor M2.

The first end of the second starting circuit is connected with the power supply 1. The second end of the fourth MOS transistor M2 is connected with the second starting circuit. The first end of the fourth MOS transistor M2 is connected with the second ends of the core circuit 200 and the shunt circuit 300. The third end of the fourth MOS transistor M2 is connected with the second starting circuit. The second end of the second starting circuit is connected with the ground wire 400.

When a surge occurs in the power supply 1, a first electrical signal is supplied to the second starting circuit through the power supply 1. The second starting circuit transmits the first electrical signal to the second end of the fourth MOS transistor M2. The fourth MOS transistor M2 is turned on under the action of the first electrical signal, and the first end of the fourth MOS transistor M2 provides a second electrical signal to the core circuit 200. The voltage of the first electrical signal is greater than the threshold voltage of the fourth MOS transistor M2.

Reference is made to FIG. 4, which is a third structural diagram of a band-gap reference source circuit provided by an embodiment of the disclosure.

In the embodiment of the disclosure, the starting circuit 100 includes a first resistor R1, a fourth MOS transistor M2, and a first diode D1.

The first end of the first resistor R1 is connected with the power supply 1. The second end of the first resistor R1 is connected to the second end of the fourth MOS transistor M2. The first end of the fourth MOS transistor M2 is connected with the second ends of the core circuit 200 and the shunt circuit 300. The third end of the fourth MOS transistor M2 is connected with the first end of the first diode D1, and the second end of the first diode D1 is connected with the ground wire 400.

In the embodiment of the disclosure, the fourth MOS transistor M2 may be an N-type MOS transistor. The second end of the first resistor R1 is connected with the gate of the fourth MOS transistor M2. The drain of the fourth MOS transistor M2 is connected to the core circuit 200 and the gate of the first MOS transistor M7. The source of the fourth MOS transistor M2 is connected to the first end of the first diode D1. When a surge occurs in the power supply 1, a first electrical signal is transmitted to the gate of the fourth MOS transistor M2. The fourth MOS transistor M2 is turned on under the action of the first electrical signal, and the drain of the fourth MOS transistor M2 provides a second electrical signal to the core circuit 200. The voltage of the first electrical signal is greater than the threshold voltage of the fourth MOS transistor M2.

Reference is made to FIG. 4, which is a third structural diagram of a band-gap reference source circuit provided by an embodiment of the disclosure.

In the embodiment of the disclosure, the core circuit 200 includes a fifth MOS transistor M6, a sixth MOS transistor M4, a second diode D3, an eighth MOS transistor M5, a ninth MOS transistor M3, and a third diode D2.

The first end of the fifth MOS transistor M6 is connected with the power supply 1. The second end of the fifth MOS transistor M6 is connected with the first end of the fourth MOS transistor M2. The third end of the fifth MOS transistor M6 is connected with the first end of the sixth MOS transistor M4. The first end of the sixth MOS transistor M4 is connected with the second end of the second MOS transistor M9. The first end of the sixth MOS transistor M4 is the first node V3. The second end of the sixth MOS transistor M4 is connected with the starting circuit 100. The third end of the sixth MOS transistor M4 is connected with the second end of the third MOS transistor M8 and the first end of the second diode D3, respectively. The third end of the sixth MOS transistor M4 is the second node V4. The second end of the second diode D3 is connected to the ground wire 400.

The first end of the eighth MOS transistor M5 is connected with the power supply 1. The second end of the eighth MOS transistor M5 is connected with the first end of the fourth MOS transistor M2 and the third end of the eighth MOS transistor M5, respectively. The third end of the eighth MOS transistor M5 is connected with the first end of the ninth MOS transistor M3. The second end of the ninth MOS transistor M3 is connected with the second end of the sixth MOS transistor M4. The third end of the ninth MOS transistor M3 is connected with the first end of the third diode D2, and the second end of the third diode D2 is connected to the ground wire 400.

In an embodiment of the disclosure, the starting circuit 100 further includes a seventh MOS transistor M1.

The first end of the seventh MOS transistor M1 is connected with the second end of the first resistor R1. The second end of the seventh MOS transistor M1 is connected with the second end of the sixth MOS transistor M4. The third end of the seventh MOS transistor M1 is connected with the first end of the first diode D1.

In the embodiment of the disclosure, the seventh MOS transistor M1 may be a P-type MOS transistor. The drain of the seventh MOS transistor M1 is connected with the second end of the first resistor R1. The gate of the seventh MOS transistor M1 is connected with the gate of the sixth MOS transistor M4. The source of the seventh MOS transistor M1 is connected with the first end of the first diode D1.

When a surge occurs in the power supply 1, the power supply 1 provides a third electrical signal to the first end of the fifth MOS transistor M6. The first end of the fourth MOS transistor M2 provides a second electrical signal to the second end of the fifth MOS transistor M6. The fifth MOS transistor M6 is turned on under the action of the second electric signal and the third electric signal to form a second voltage dividing signal, and transmits the second voltage dividing signal to the first end of the sixth MOS tube M4. The first end of the sixth MOS transistor M4 is connected with the second end of the sixth MOS transistor M4. The sixth MOS transistor M4 is turned on under the action of the second voltage dividing signal, and the sixth MOS transistor M4 transmits the first voltage difference signal to the second end of the second MOS transistor M9 through the first end of the sixth MOS transistor M4, and transmits the second voltage difference signal to the second end of the third MOS transistor M8 through the third end of the sixth MOS transistor M4. The second MOS tube M9 and the third MOS tube M8 are turned on under the action of the first voltage difference signal and the second voltage difference signal, and a part of the current is consumed through the ground wire 400 to reduce the current of the electronic device 500.

In the embodiment of the disclosure, the fifth MOS transistor M6 may be a P-type MOS transistor. The sixth MOS transistor M4 may be an N-type MOS transistor. The source of the fifth MOS transistor M6 is connected with the power supply 1. The gate of the fifth MOS transistor M6 is connected with the drain of the fourth MOS transistor M2. The drain of the fifth MOS transistor M6 is connected with the drain of the sixth MOS transistor M4. The drain of the sixth MOS transistor M4 is connected with the gate of the second MOS transistor M9. The drain of the sixth MOS transistor M4 is the first node V3. The gate of the sixth MOS transistor M4 is connected with the starting circuit 100. The source of the sixth MOS transistor M4 is connected with the gate of the third MOS transistor M8 and the first end of the second diode D3, respectively. The source of the sixth MOS transistor M4 is the second node V4. The second end of the second diode D3 is connected with the ground wire.

In the embodiment of the disclosure, the eighth MOS transistor M5 may be a P-type MOS transistor. The ninth MOS transistor M3 may be an N-type MOS transistor. The source of the eighth MOS transistor M5 is connected with the power supply 1. The gate of the eighth MOS transistor M5 is connected with the drain of the fourth MOS transistor M2 and the drain of the eighth MOS transistor M5, respectively. The drain of the eighth MOS transistor M5 is connected with the drain of the ninth MOS transistor M3. The gate of the ninth MOS transistor M3 is connected with the gate of the sixth MOS transistor M4. The source of the ninth MOS transistor M3 is connected with the first end of the third diode D2, and the second end of the third diode E2 is connected with the ground wire 400.

In an embodiment of the disclosure, the core circuit 200 further includes a second resistor R4.

The first end of the second resistor R4 is connected with the third end of the sixth MOS transistor M4. The second end of the second resistor R4 is connected to the ground wire 400.

When a surge occurs in the power supply 1, the sixth MOS transistor M4 transmits the second voltage difference signal to the second end of the third MOS transistor M8 through the third end of the sixth MOS transistor M4 under the action of the second voltage dividing signal, and the second voltage difference signal is shunted through the second resistor R4.

In an embodiment of the disclosure, the core circuit 200 further includes a third resistor R2 and a fourth resistor R3.

In the embodiment of the disclosure, the first ends of the third resistor R2 and the fourth resistor R3 are connected with the third end of the ninth MOS transistor M3. The second end of the third resistor R2 is grounded. The second end of the fourth resistor R3 is connected with the first end of the third diode D2.

In the embodiment of the disclosure, the third resistor R2 shunts a current flowing through the third diode D2. The fourth resistor R3 is configured to divide a voltage flowing through the third diode D2.

Figure 5:
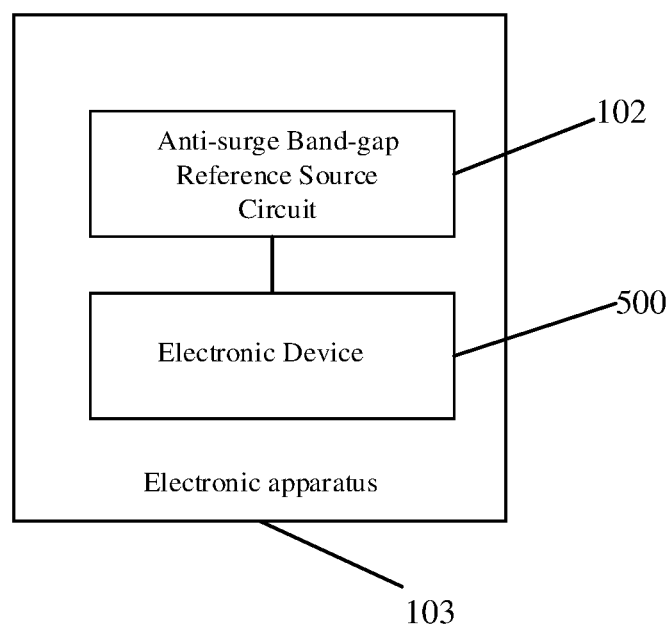
FIG. 5 is a structural diagram of an electrical apparatus provided by an embodiment of the disclosure.

Reference is made to FIG. 5, which shows a structural diagram of an electrical apparatus 103 provided by an embodiment of the disclosure. The electronic apparatus 103 includes an electronic device 500 and a band-gap reference source circuit 102 in the above-mentioned embodiments. In an embodiment of the disclosure, the power supply 1 of the band-gap reference source circuit 102 is connected with the starting circuit 100, the core circuit 200, and the first end of the output circuit 600 respectively for feeding power. The second end of the starting circuit 100 is connected with the core circuit 200 and configured to provide a starting signal to the core circuit 200. The second end of the core circuit 200 is connected with the output circuit 600, and the control end of the core circuit 200 is connected with the shunt circuit 300 for providing a control signal to the shunt circuit 300. The output end of the output circuit 600 is configured to be connected with the electronic device 500, and the output circuit 600 provides a voltage and/or a current based on the core circuit 200. The first end of the shunt circuit 300 is connected with the output end of the output circuit 600, and the current of the second end is controlled based on the control signal to shunt the output circuit 600, so that the electronic device 500 connected to the band-gap reference source circuit can be effectively protected.

The above is only the embodiments of the disclosure, but the protection scope of the disclosure is not limited thereto. Any change or substitution that may be easily to think within the technical scope disclosed in this disclosure by those skilled in the art should fall with the protection scope of this disclosure. Therefore, the scope of protection of this disclosure shall be subject to the scope of protection of the claims.

In the embodiments of the disclosure, the power supply is connected with the first ends of the starting circuit, the core circuit and the output circuit respectively for feeding power. The second end of the starting circuit is connected with the core circuit and configured to provide a starting signal to the core circuit. The second end of the core circuit is connected with the output circuit, and the control end of the core circuit is connected with the shunt circuit for providing a control signal for the shunt circuit. The output end of the output circuit is configured to be connected with the electronic device, and the output circuit provides a voltage and/or a current based on the core circuit. The first end of the shunt circuit is connected with the output end of the output circuit, and a current of the second end is controlled based on the control signal to shunt the output circuit. Further, a part of the current is consumed through the ground wire, so as to reduce the current of the electronic device and effectively protect the electronic device connected with the band-gap reference source circuit.

The invention claimed is:

1. A band-gap reference source circuit, configured to be connected with an electronic device, comprising: a power supply, a starting circuit, a core circuit, an output circuit and a shunt circuit, wherein,
the power supply is connected with first ends of the starting circuit, the core circuit and the output circuit, respectively, for feeding power;
a second end of the starting circuit is connected with the core circuit for providing a starting signal to the core circuit;

a second end of the core circuit is connected with the output circuit, and a control end of the core circuit is connected with the shunt circuit, for providing a control signal to the shunt circuit;

an output end of the output circuit is configured to be connected with the electronic device, and the output circuit provides a voltage and/or a current based on the core circuit; and a first end of the shunt circuit is connected with the output end of the output circuit, and a current of a second end is controlled based on the control signal to shunt the output circuit;

wherein the shunt circuit comprises a shunt MOS transistor; and a first end of the shunt MOS transistor is connected with the output end of the output circuit, a second end of the shunt MOS transistor is connected with a control node of the control end of the core circuit, and a third end of the shunt MOS transistor is connected with a ground wire;

wherein the shunt MOS transistor comprises a second MOS transistor and a third MOS transistor; the second MOS transistor is an N-type MOS transistor and the third MOS transistor is a P-type MOS transistor; a drain of the second MOS transistor is connected with the output end of the output circuit, a gate of the second MOS transistor is connected with a first node of the core circuit, a source of the second MOS transistor is connected with a source of the third MOS transistor, and a gate of the third MOS transistor is connected with a second node of the core circuit; and the core circuit transmits a first voltage difference signal to the gate of the second MOS transistor through the first node, and the core circuit transmits a second voltage difference signal to the gate of the third MOS transistor through the second node; the second MOS transistor and the third MOS transistor are turned on under an action of the first voltage difference signal and the second voltage difference signal.

2. The band-gap reference source circuit of claim 1, wherein the control signal comprises a first voltage difference signal and a second voltage difference signal,
the shunt circuit is turned on when a difference between the first voltage difference signal and the second voltage difference signal is greater than a preset value; and
the shunt circuit is turned off when the difference between the first voltage difference signal and the second voltage difference signal is less than the preset value.

3. The band-gap reference source circuit of claim 1, wherein the second MOS transistor and the third MOS transistor are turned on when a difference between the first voltage difference signal and the second voltage difference signal is greater than a sum of threshold voltages of the second MOS transistor and the third MOS transistor.

4. The band-gap reference source circuit of claim 1, wherein the output circuit has a first output module for outputting a current and/or a second output module for outputting a voltage.

5. The band-gap reference source circuit of claim 4, wherein the first output module comprises a first MOS transistor, a first end of the first MOS transistor is connected with the power supply, a second end of the first MOS transistor is configured to be connected with the core circuit and forms a first current mirror, and a third end of the first MOS transistor is connected with the electronic device; and
the second output module comprises a tenth MOS transistor, a first end of the tenth MOS transistor is connected with the power supply, a second end of the tenth MOS transistor is connected with the core circuit and forms a second current mirror, a third end of the tenth MOS transistor is connected with a first end of a fifth resistor and configured to be connected with the electronic device, wherein a second end of the fifth resistor is grounded.

6. The band-gap reference source circuit of claim 1, wherein the starting circuit comprises: a second starting circuit and a fourth MOS transistor;
a first end of the second starting circuit is connected with the power supply, a second end of the fourth MOS transistor is connected with the second starting circuit, a first end of the fourth MOS transistor is connected with the second end of the core circuit and a second end of the shunt circuit, a third end of the fourth MOS transistor is connected with the second starting circuit, and a second end of the second starting circuit is connected with the ground wire.

7. The band-gap reference source circuit of claim 6, wherein the second starting circuit comprises a first resistor and a first diode;
a first end of the first resistor is connected with the power supply, a second end of the first resistor is connected with the second end of the fourth MOS transistor, the first end of the fourth MOS transistor is connected with the second ends of the core circuit and the shunt circuit, the third end of the fourth MOS transistor is connected with a first end of the first diode, and a second end of the first diode is connected with the ground wire.

8. The band-gap reference source circuit of claim 6, wherein the core circuit comprises a fifth MOS transistor, a sixth MOS transistor, a second diode, an eighth MOS transistor, a ninth MOS transistor, and a third diode;
a first end of the fifth MOS transistor is connected with the power supply, a second end of the fifth MOS transistor is connected with the first end of the fourth MOS transistor, a third end of the fifth MOS transistor is connected with a first end of the sixth MOS transistor, the first end of the sixth MOS transistor is connected with the second end of the second MOS transistor, the first end of the sixth MOS transistor is the first node, a second end of the sixth MOS transistor is connected with the starting circuit, a third end of the sixth MOS transistor is connected with the second end of the third MOS transistor and a first end of the second diode respectively, the third end of the sixth MOS transistor is the second node, and a second end of the second diode is connected with the ground wire;
a first end of the eighth MOS transistor is connected with the power supply, a second end of the eighth MOS transistor is connected with the first end of the fourth MOS transistor and a third end of the eighth MOS transistor respectively, the third end of the eighth MOS transistor is connected with a first end of the ninth MOS transistor, a second end of the ninth MOS transistor is connected with the second end of the sixth MOS transistor, a third end of the ninth MOS transistor is connected with a first end of the third diode, and a second end of the third diode is connected with the ground wire; and
wherein the starting circuit further comprises a seventh MOS transistor;
a first end of the seventh MOS transistor is connected with a second end of the first resistor, a second end of the seventh MOS transistor is connected with the second end of the sixth MOS transistor, and a third end of the seventh MOS transistor is connected with a first end of the first diode.

9. The band-gap reference source circuit of claim 8, wherein the core circuit further comprises a third resistor and a fourth resistor;
first ends of the third resistor and the fourth resistor are respectively connected with the third end of the ninth MOS transistor, a second end of the third resistor is grounded, and a second end of the fourth resistor is connected with the first end of the third diode; and
the third resistor is configured to shunt a current flowing through the third diode, and the fourth resistor is configured to divide a voltage flowing through the third diode.

10. An electronic apparatus comprising: an electronic device and a band-gap reference source circuit of claim 1 connected with the electronic device.

\* \* \* \* \*